Dec. 12, 1967    P. BRINCH-MOLLER    3,357,468
DOMESTIC CHOPPING APPARATUS
Filed Feb. 18, 1965    3 Sheets-Sheet 1

INVENTOR
PETER BRINCH-MØLLER

BY  Nolte & Nolte

ATTORNEYS

Dec. 12, 1967  P. BRINCH-MOLLER  3,357,468
DOMESTIC CHOPPING APPARATUS
Filed Feb. 18, 1965  3 Sheets-Sheet 2

INVENTOR
PETER BRINCH-MØLLER

BY  *Nolte & Nolte*

ATTORNEYS

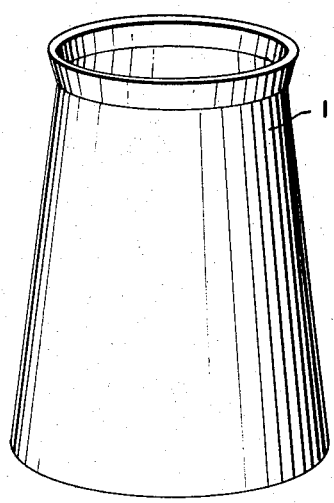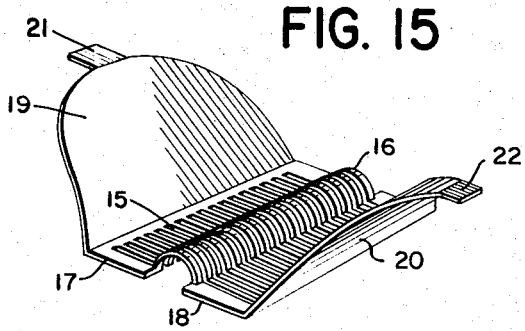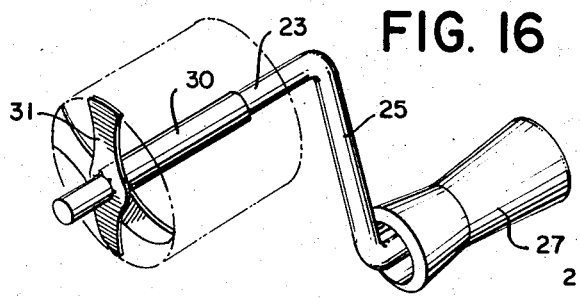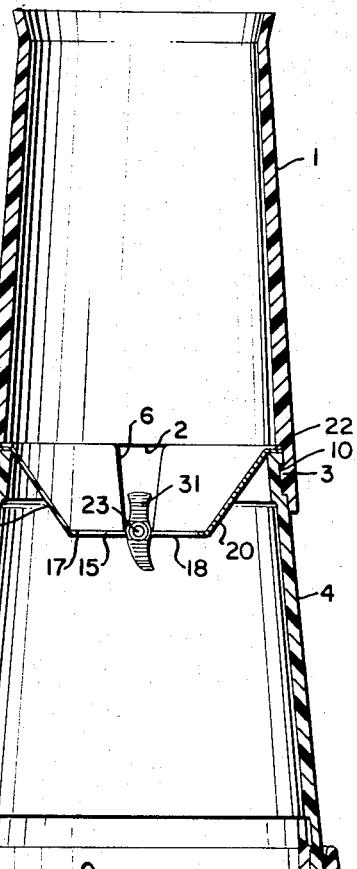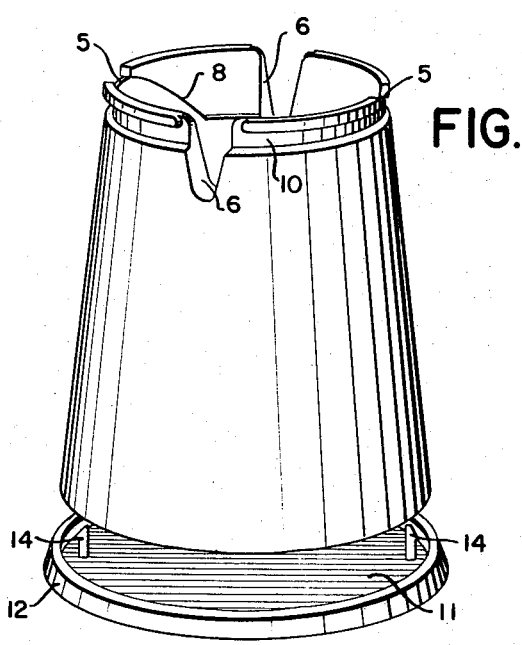
INVENTOR
PETER BRINCH-MØLLER
BY Nolte & Nolte
ATTORNEYS United States Patent Office 3,357,468
Patented Dec. 12, 1967

3,357,468
DOMESTIC CHOPPING APPARATUS
Peter Brinch-Moller, Bagsvaerd, Denmark, assignor to AKTS. EVA Husholdningsmaskiner, Skive, Denmark
Filed Feb. 18, 1965, Ser. No. 433,702
Claims priority, application Denmark, Feb. 19, 1964, 806/64
5 Claims. (Cl. 146—123)

ABSTRACT OF THE DISCLOSURE

A knife axle is rotatably mounted in the base portion of domestic chopping apparatus. A plurality of knives are mounted on the knife axle for rotation therewith and extend radially therefrom. A grate is positioned over the knife axle and is in contact with the knife axle. The grate has edges supported by the base portion. A plurality of slits are formed through the grate and extend transverse to the axis in a manner whereby the knives cooperate with the grate when the knife axle is rotated. A funnel portion is mounted on the base portion over the grate.

---

Figure 1:
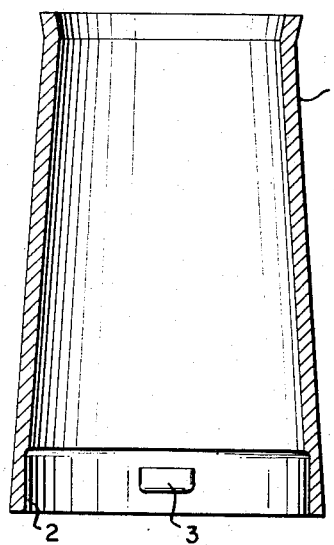

The invention relates to a domestic chopping apparatus, especially a parsley chopper, and of the type that has a knife axle with a number of protruding knives and a grate plate through which the knives are moved by turning the axle, and where a funnel is attached to the grate plate. The object of the invention is to devise an apparatus of the type indicated where an especially advantageous cutting is obtained, and where moreover a series of advantages are obtained as will be seen from the following description and drawing.

The characterizing feature of the apparatus according to the invention is that the grate is placed over the knife axle. It has turned out that hereby an especially cutting is obtained in that the knives, to a greater degree than in the previously known apparatuses, pull the material effectively to be cut by the grate plate. The grate may, according to the invention, be arranged so as to rest on the knife axle. By these means an especially good support for the grate plate is obtained, which is of essential importance as the grate plate then may be made with a slight thickness. The grate may, according to the invention, have a central portion that is curved up over the knife axle and lateral portions that are placed low in relation to the highest point of the central portion, e.g., lower than the axis of the knife axle. Hereby there is obtained an especially advantageous cutting effect, and there is no tendency for the material in an undesired manner being pulled round by the knife axle without being cut.

The grate plate may according to the invention, be detachably arranged. By these means there is obtained an advantageous handling of the apparatus, especially with regard to cleaning. The knives may, according to the invention and as a relatively loose fit be slipped on, in a tube of deformable material, preferably aluminum, and the tube may thereafter be slipped unto an axle of hard material having so large a diameter that the tube expands and is pressed tight in the knives, that preferably have notches in the bore. The knife axle may, according to the invention, be detachably arranged. Hereby the cleaning of the apparatus is facilitated.

The funnel may, according to the invention, be detachably arranged on a nether portion, and it is preferably constructed in such a manner that it serves for the securing of the grate plate and the knife axle, the funnel preferably having a bayonet engagement with the nether portion. Hereby the separation for cleaning is considerably facilitated and a trustworthy securing of the portions is obtained. The funnel may, according to the invention, be tapered upwards. Hereby it is ensured that the inserted material to be chopped will fall down on the cutting mechanism and it is avoided that it overflows out of the funnel. The nether portion may, according to the invention, be formed like a container. Hereby the chopped material may be collected without having to use a special container for this purpose. The nether portion may have a detachable bottom plate. By these means it is obtained that the nether portion may be used either as a collecting container or as a dispatching funnel.

Figure 2:
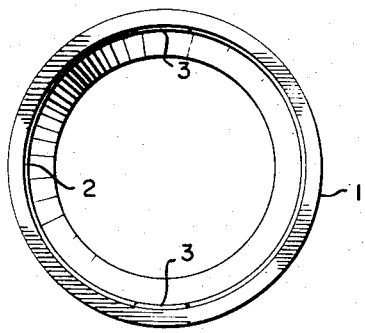
Figure 3:
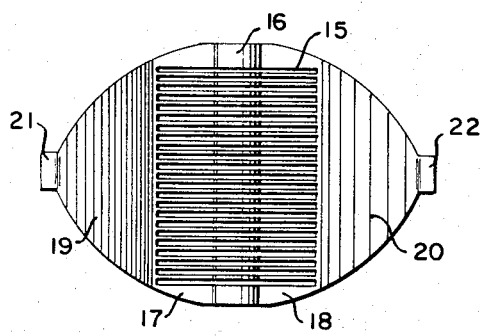
Figure 4:
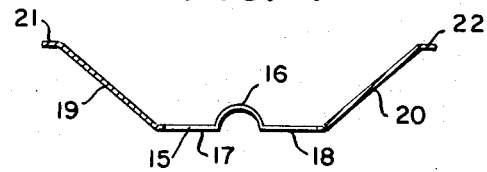
Figure 5:
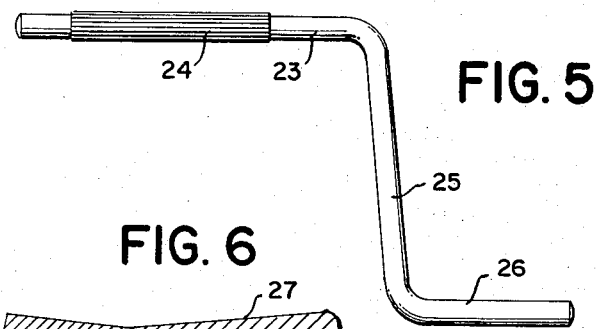
Figure 6:
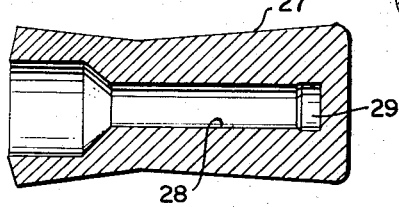
Figure 7:
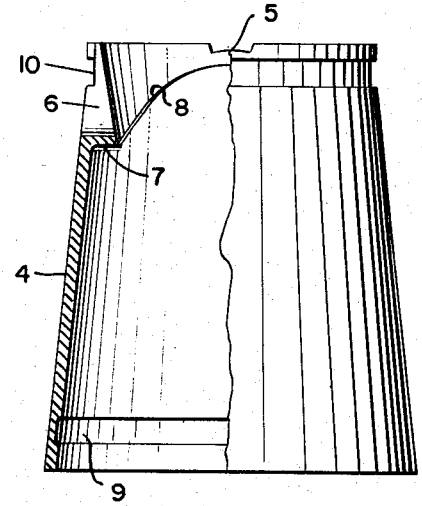
Figure 8:
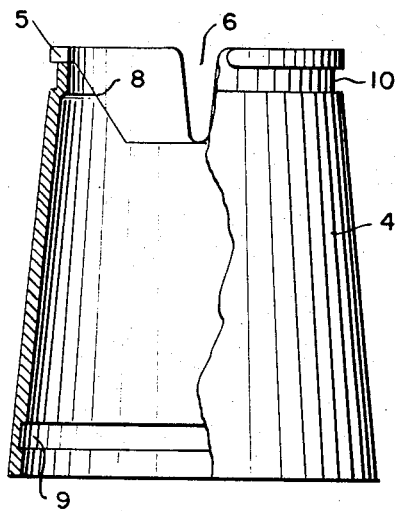
Figure 9:
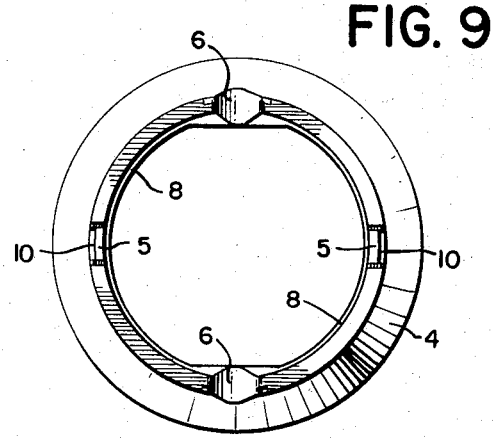
Figure 10:
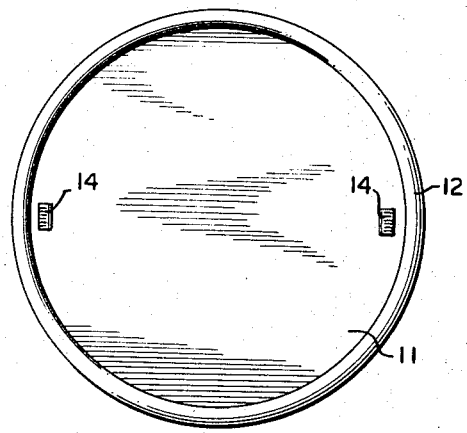
Figure 11:
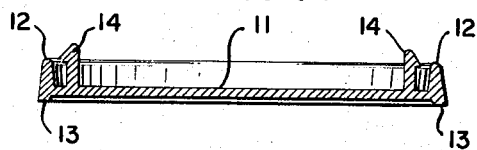
Figure 13:
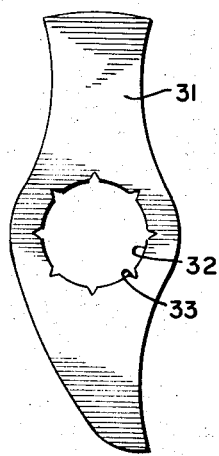
Figure 12:
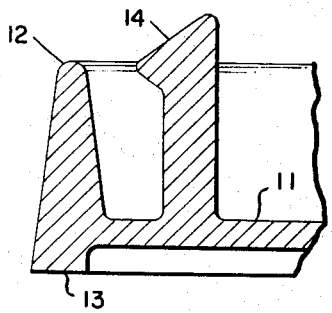

In the drawing there is shown a domestic chopping apparatus according to the invention, where FIG. 1 shows a vertical section through an upper portion of funnel,
FIG. 2 the same seen from above,
FIG. 3 a grate plate seen from above,
FIG. 4 a vertical section through the same,
FIG. 5 a knife axle,
FIG. 6 a longitudinal section through an operating member for the same,
FIG. 7 a lateral view of a nether portion, seen partly in vertical section,
FIG. 8 the same seen in a direction at right angles to the direction in FIG. 7 and partly in vertical section,
FIG. 9 the same seen from above,
FIG. 10 a bottom plate for the nether portion seen from above,
FIG. 11 a vertical section through same,
FIG. 12 a portion of FIG. 11 in larger scale,
FIG. 13 a knife in large scale,
FIG. 14 a perspective view of the upper portion,
FIG. 15 a perspective view of the grate plate,
FIG. 16 a perspective view of the knife axle with handle and knives,
FIG. 17 a perspective view of the nether portion and the bottom plate in separated condition, and
FIG. 18 a vertical section through the chopping apparatus.

In the drawing the numeral 1 designates a funnel, that may be made of aluminum by molding. The funnel is substantially conical with the greatest diameter below. In the innerside of the funnel and towards the bottom there is formed a nearly cylindrical recess 2 having towards each other directed projections 3. The upper edge of the recess 2 has slightly varying height, being lowest just above the projections and highest at the middle of the distance between them.

A nether portion 4 is likewise made of aluminum by molding, and it has likewise a conical form with the largest diameter below. In the upper edge there is made two relatively shallow recesses 5 with rounded top edge, and furthermore two deep recesses 6. In connection with the bottoms of the recesses 6 there are made, in the inner side of the nether portion, inwards projecting portions 7 to which are connected flat projecting regions with a top edge 8. Towards the bottom of the inner side there is made a circumferential recess 9. Towards the top of the outer side there is made a circumferential recess 10.

The underplate shown in FIGS. 10–12 have a plate portion 11 with a circumferential upwards projecting edge portion 12 and a downwards projecting edge portion 13. Inside the edge portion 12 there is placed two upwards projecting projections 14. In practice it will presumably be most practical to have 3 such projections.

The grate plate shown in FIGS. 3 and 4 is shown in FIG. 3 in unbent condition, before it is bent into the shape shown in FIG. 4. The plate has a number of parallel slits 15 that possibly can be machined. The plate is bent to form a central portion 16 that is curved upwards and possibly may be considerably higher than shown, two horizontal lateral portions 17 and 18, two oblique portions 19, 20 and two approximately horizontal flaps 21 and 22 the transverse profile of the latter perhaps being curved in correspondence with the top edges of the recesses 5.

A knife axle, FIG. 5 has an axle portion 23 with longitudinal grooves 24, a crank arm 25 and a handle arm 26. On the handle arm there is rotatably placed a handle 27, FIG. 6, the bore 28 of which at its inner end has an undercutting 29 that cooperates with a not shown thickening at the end of the arm 26 to secure the handle.

On the axle 23 there is placed an aluminum tube 30 on which there is secured a number of two armed knives 31. The knives have a stamped out hole 32 with outwards projecting recesses 33. The hole 32 may be a loose fit in relation to the employed aluminum tube 30 so that the knives easily are slipped on it. The inner diameter of the tube is, however, somewhat smaller than the outer diameter of the axle 23, and when slipping the tube 30 on the axle 23 the tube 30 therefore will expand so that it is pressed tight in the holes 32 in the knives 31 and partly penetrating into the recess 33. Hereby there is obtained a robust fastening.

When mounting the apparatus the knife axle 23 is laid in the recesses 6 and the grate plate is placed over it with the flaps 21 and 22 resting in the recesses 5. Thereafter the funnel 1 is placed on the nether portion, being put down in such a manner that the projection 3 are led down into the recesses 6 whereafter the funnel is turned on the nether portion so that the projections 3 slide in the groove 10. On account of the varying height of the recess 2 this edge will cooperate with the over the top edge of the nether portion projecting flaps 21 and 22 so as to cause the latter to be clamped fast. At the same time the bottom edge of the funnel 1 holds the axle 23 in position below in the recesses 6. Hhe grate plate is supported partly by the axle 23, partly by the edges 8, so that it gets a good support. The material to be chopped, e.g. parsley, is placed in the funnel 1 and will easily fall down on account of the conical shape of the latter. The material to be chopped is taken along by turning the knives and is cut to pieces in the ordinary manner. There is no tendency for the material to be chopped jamming in an undesired manner as is the case in the known chopping apparatuses.

When the bottom plate is removed the chopped material may be dribbled directly down, and by mounting the bottom plate the material may be collected in the container consisting of the nether portion and the bottom plate.

The shown and described embodiment is only to be considered as an example as various variations are conceivable within the scope of the invention.

I claim:
1. Domestic chopping apparatus comprising
   a base portion;
   a knife axle rotatably mounted in said base portion, said knife axle having an axis;
   a plurality of knives mounted on said knife axle for rotation therewith and extending radially therefrom;
   a grate positioned over said knife axle, and being in direct contact with said knife axle, said grate having edges supported by said base portion, and a plurality of slits formed therethrough and extending transverse to said axis in a manner whereby said knives cooperate with said grate when said knife axle is rotated; and
   a funnel portion mounted on said base portion over said grate.

2. Domestic chopping apparatus as claimed in claim 1, wherein said grate has a centrally extending transverse ridge thereacross opening downward and of semicylindrical configuration corresponding to a half cross-sectional area of said knife axle and having a pair of spaced lateral edges, and identical lateral portions extending diametrically opposite each other from both lateral edges of said ridge in a substantially horizontal plane, each of said lateral portions having a lower surface and extending for the same distance from said ridge, and wherein said knife axle is positioned in said ridge in a manner whereby the axis of said knife axle is coplanarly positioned with the lower surfaces of the lateral portions of said grate.

3. Domestic chopping apparatus as claimed in claim 1, wherein said knife axle has two axial ends, said funnel portion has a lower edge part and said base portion has an upper edge part having two pairs of diametrically opposite notches formed therein, the notches of each of said pairs of notches being spaced substantially 90° from those of the other, the axial ends of said knife axle being positioned in corresponding notches of one of said pairs of notches and the edges of said grate being positioned in corresponding notches of the other of said pairs of notches, the lower edge part of said funnel portion covering the axial ends of said knife axle and the edges of said grate in the corresponding notches, and wherein said funnel and base portions include cooperating fastening means for removably affixing said funnel and base portions to each other and for urging the lower edge part of said funnel portion tightly against the upper edge part of said base portion thereby maintaining the edges of said grate tightly in position in the corresponding apertures.

4. Domestic chopping apparatus as claimed in claim 1, further comprising a tubular member of deformable material having an inner diameter slightly smaller than the diameter of said knife axle, and wherein said knife axle has grooves formed in its surface extending substantially parallel to the axis thereof and said tubular member is coaxially positioned on said knife axle, each of said plurality of knives having a peripherally notched aperture formed therethrough and positioned on said tubular member, said knives being rigidly affixed to said tubular member by deformation of the material thereof upon the forcing of said tubular member onto said knife axle.

5. Domestic chopping apparatus as claimed in claim 1, wherein said funnel portion has a substantially truncated conical configuration positioned with the smaller diameter higher than the larger diameter.

References Cited
UNITED STATES PATENTS

| | | | |
|---|---|---|---|
| 2,001,075 | 5/1935 | Sundstrand | 146—123 |
| 2,121,453 | 6/1938 | Sundstrand | 146—122 |
| 2,280,211 | 4/1942 | Bernhardt | 146—123 |

FOREIGN PATENTS 445,856  6/1927  Germany.

W. GRAYDON ABERCROMBIE, *Primary Examiner.*